Figure 3:
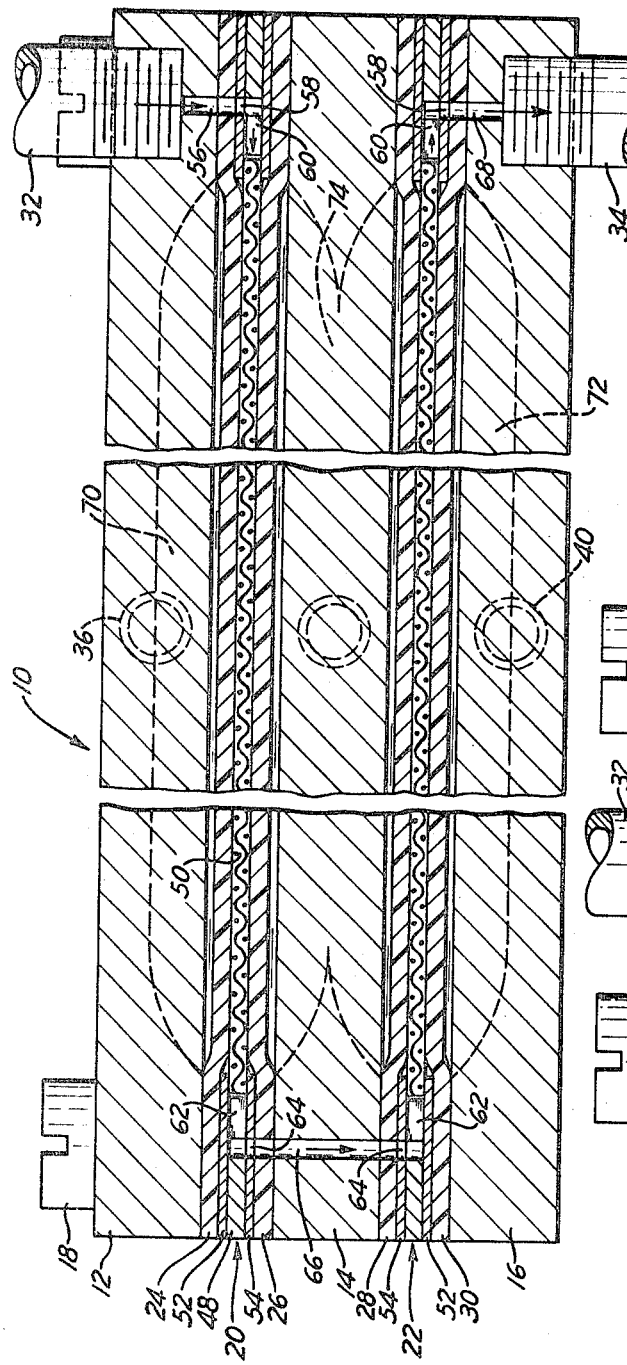
Figure 4:
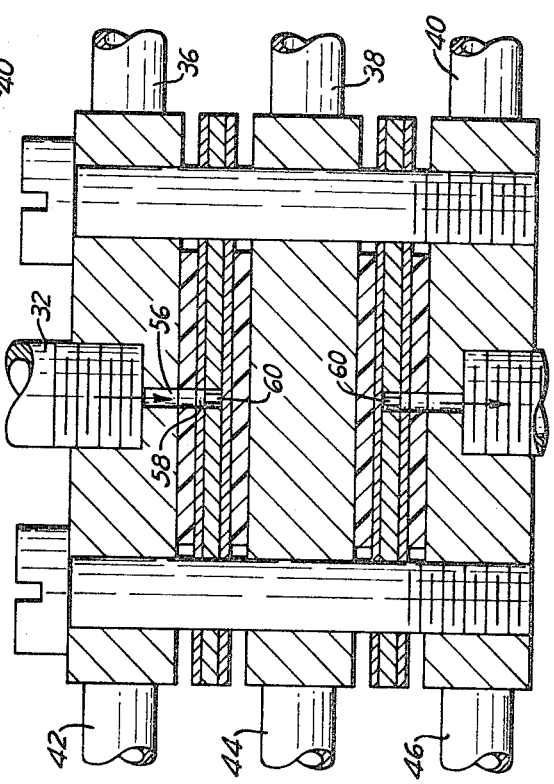

United States Patent [19]

Mousseau, Jr. et al.

[11] 3,735,562

[45] May 29, 1973

[54] MEMBRANE GAS EXTRACTOR

[75] Inventors: Richard J. Mousseau, Jr.; Homer Patnode, both of Gibsonia, Pa.

[73] Assignee: Gulf Research & Development Company, Pittsburgh, Pa.

[22] Filed: June 9, 1971

[21] Appl. No.: 151,212

[52] U.S. Cl. ................................................55/158
[51] Int. Cl. .............................................B01d 59/12
[58] Field of Search.....................55/16, 158, 159; 210/321

[56] References Cited

UNITED STATES PATENTS

| | | |
|---|---|---|
| 3,239,996 | 3/1966 | Huffman et al..........................55/16 |
| 3,342,729 | 9/1967 | Strand....................................55/158 |
| 3,241,293 | 3/1966 | Pfafferle.................................55/16 |
| 3,416,985 | 12/1968 | Dounoucos............................55/16 |
| 3,520,803 | 7/1970 | Jaconelli ................................55/16 |
| 3,002,770 | 10/1961 | Chesnut et al.........................252/12 |
| 3,651,618 | 3/1972 | Klein......................................55/16 |

*Primary Examiner*—Charles N. Hart
*Attorney*—Meyer Neishloss, Deane E. Keith and William Kovensky

[57] ABSTRACT

An improved gas/liquid separator cell utilizing membranes formed of coherent films of unsintered polytetrafluorethylene.

8 Claims, 7 Drawing Figures

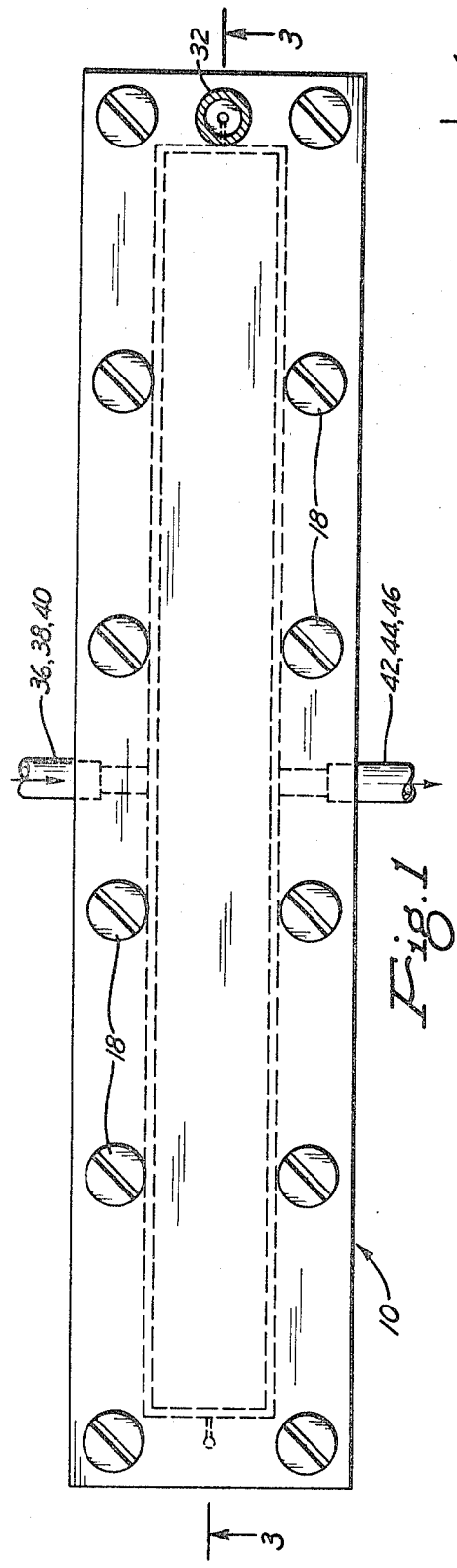
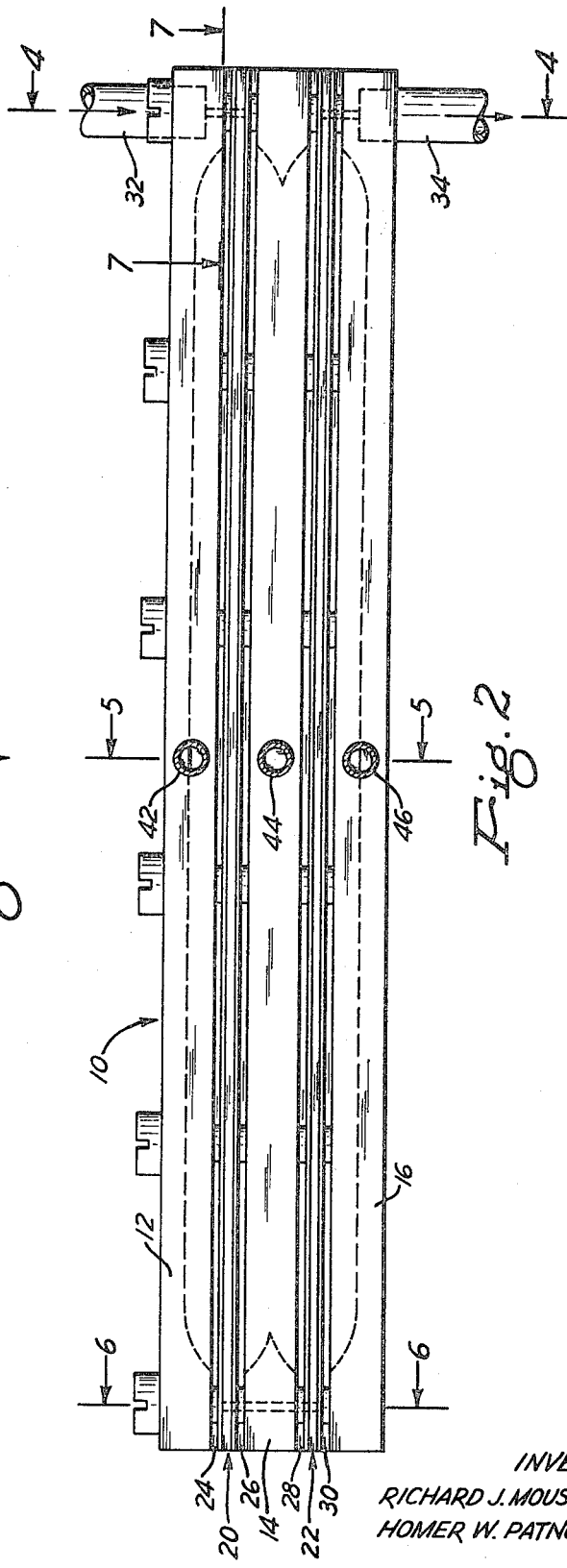

INVENTORS.
RICHARD J. MOUSSEAU, JR.
HOMER W. PATNODE

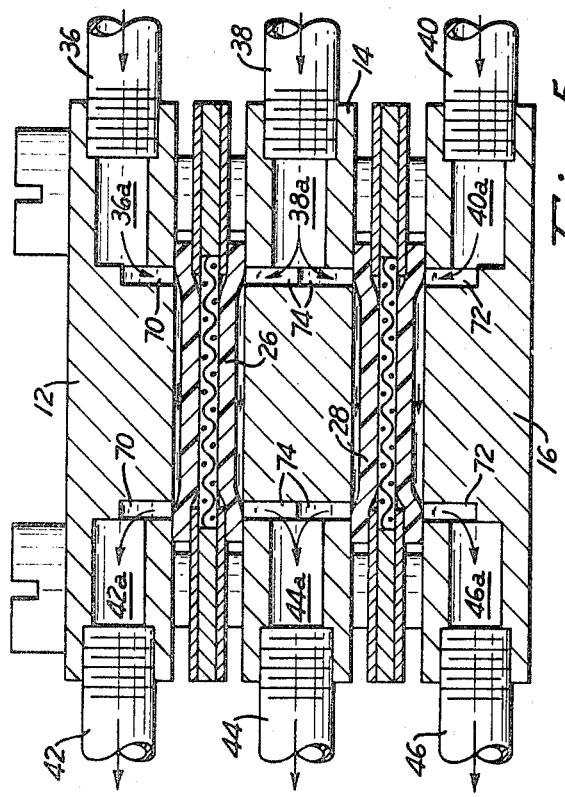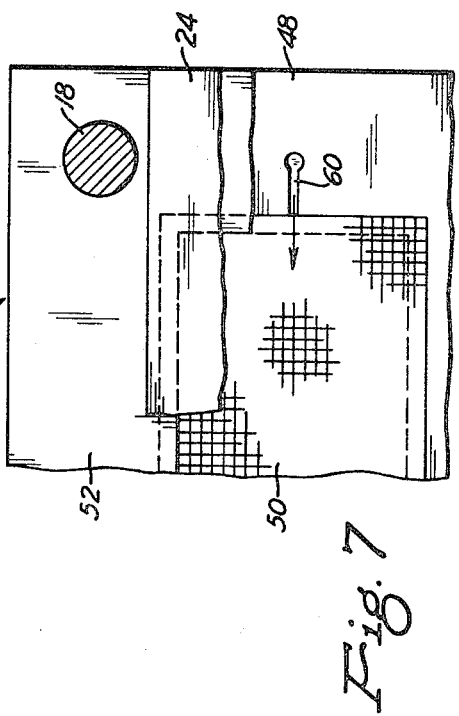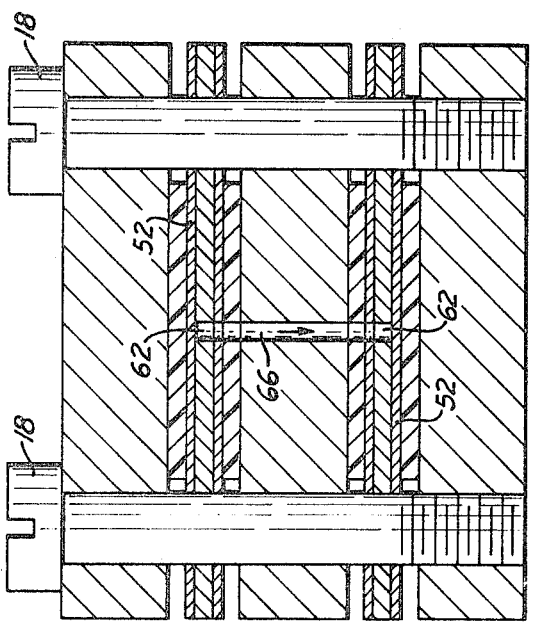

MEMBRANE GAS EXTRACTOR

This invention relates to the art of fluid separation. More in particular, the invention pertains to an improved means to measure gases dissolved in liquids utilizing membrane separation.

The invention was developed in the environment of geophysical exploration, and in that particular area thereof wherein it is desired to take samples from a body of water, and to then analyze for any gases which may be dissolved in the water. The theory is that hydrocarbon deposits in the bed underlying the body of water will often evidence themselves by gas seeps, and that by analyzing for hydrocarbon gases in the water such deposits can be found. As is known to those skilled in exploration, the raw data concerning dissolved gases must then be correlated to navigation data, currents, background gases in the water, and the like, before identifying a likely place to drill a hydrocarbon well. The invention could have utility in other fields than geophysical exploration, for example, oceanography, and water pollution studies.

The invention resides in the combination of a particular configuration of a separator cell together with a particular membrane at which the gas/liquid separation occurs. Gas/liquid separation using membranes is generally known in the art. In developing the invention many different materials were tried, and all but one were found lacking in one respect or another. The membrane must be hydrophobic, i.e., it must repel water, while at the same time permitting the gas molecules to pass through the membrane. The general mechanism and the physics of membrane separation is explained further in the A.C.S. Monograph series text entitled "Diffusion and Membrane Technology", by S. B. Tuwiner, published by Reinhold in New York, copyright 1962, see particularly the introduction, pages 1–6. However, the particular membrane used in the invention may function as a non-selective porous barrier, rather than by the more usual processes of solution and diffusion into and through the membrane. The difference in these two mechanisms is well known, and is clearly shown on page 3 of a brochure number GEA-8685A 2-70, issued by General Electric Co., Medical Division. In addition to passing the gas freely and none of the liquid water, the membrane utilized must separate out the gas at a rate of speed sufficient to permit meaningful results. Some of the membranes which were unsuccessfully used are polyethylene and non-porous Teflon. These materials did function, but at an unacceptably slow rate of speed.

We have discovered that a certain commercially available tape is uniquely suited for use in the invention. The tape is described in U.S. Pat. No. 3,002,770 to Chesnut et al. From said patent it can be seen that this material comprises pure Teflon prepared in a certain manner, and intended to be used as pipe dope in tape form. The patent describes the tape as a "coherent film of unsintered polytetrafluoroethylene". The tape is commercially available from Chemplast Inc. of Wayne, N.J. under the tradename "Chemfluor Lab-Tape". The same material is thought to be available under the tradename "PIPE-PAC" from the Johns-Manville Co. The tape is thought to be porous as to gas but sufficiently hydrophobic as to prohibit passage of liquid water.

The separator cell of the invention is characterized by its compact construction and means to support four membranes therein in two pairs and means to efficiently and quickly supply sample water to the outside of all membranes and to collect the separated gases from between the membranes of each pair while at the same time holding the membranes apart. The unique plastic tape used as the membrane is quite inexpensive and the invention provides simple means to disassemble the cell to replace the tape as needed. The cell parts are of simple construction, while at the same time providing a leak-proof, highly reliable structure, which is simple to manufacture and yet sure and accurate in use.

The above and other advantages of the invention will be pointed out or will become evident in the following detailed description and claims, and in the accompanying drawing also forming a part of the disclosure, in which:

FIG. 1 is a top plan view of a separator cell embodying the invention;
FIG. 2 is a side elevational view thereof;
FIG. 3 is a longitudinal cross-sectional view taken on line 3—3 of FIG. 1; and
FIGS. 4, 5, 6 and 7 are cross-sectional views taken on lines 4—4, 5—5, 6—6, and 7—7 of FIG. 2, respectively.

Referring now to FIGS. 1 and 2, there is shown a separator cell 10 embodying the invention in general external view. Cell 10 comprises a top member 12, a middle member 14 and a bottom member 16 all secured together by a plurality of bolts or screws 18. Between the top and middle members 12 and 14 is a screen assembly 20, and another screen assembly 22 is positioned between the middle and bottom members. Four membranes 24, 26, 28 and 30 complete the assembly and are positioned one to each side of each screen assembly 20 and 22.

The thickness of the plastic tapes is shown greatly exaggerated for the purpose of clarity in the drawings.

Means are provided to flow a carrier gas between the two "sandwiches" formed by each screen assembly 20 and 22 and its two associated membranes. To this end, a conduit 32 is connected to top member 12, and a conduit 34 is connected to bottom member 16. A system of internal passageways, described further below, interconnects the two conduits 32 and 34 via the screens in the assemblies 20 and 22.

Means are also provided to flow water or other liquid containing dissolved gases to the outsides of each of the two sandwiches formed by each screen and its associated two membranes. To this end, a series of three conduits 36, 38 and 40 supply sample water to each of the top, middle and bottom members, and flow said water across the outside of all of the four membranes via other internal passageways described below.

Three conduits 42, 44 and 46 are connected to each of the top, middle and bottom members to carry away the sample liquid, and are associated each with one of three supply conduits 36, 38 and 40, respectively. Of course, as will be evident to those skilled in the art, each set of the three supply or the three removal conduits could be connected together by suitable fittings somewhere spaced away from the separator cell 10, or three separate supply systems could be provided for better operation and control.

Referring now to FIG. 3, the structure of the two screen assemblies 20 and 22 is shown in detail. The two screens are identical in construction, and therefore only screen 20 will be described in detail. As is obvious, the screens are mounted in the assembly "upside-down" with respect to each other. Each screen assembly comprises a central framing member 48 within which is snugly fitted the screen 50 itself. Means are provided to snugly hold the screen 50 in position within the framing member 48. To this end, screen assembly 20 comprises a pair of screen hold-down plates 52 and 54. Thus, the screen 50 is held in the assembly by its snug fit within frame 48 and by the hold-down plates 52 and 54 which grip the edges of the screen above and below. As is clear, the framing member 48 has a thickness substantially equal to or slightly greater than the thickness of screen 50.

The three members 52, 54 and 48 are securely fastened together by any suitable means such as soldering or cementing, and these members, as well as screws 18, are made from suitable corrosion resistant material such as brass. Similarly, screen 50 is made of a corrosion resistant material such as stainless steel. In order to provide a large degree of mechanical support for the membranes 24, 26, 28 and 30, screen 50 is preferably of fine mesh. In the successfully constructed embodiment, screen 50 was formed of stainless steel wire, 0.0075 inches diameter, having a mesh of 60.

The exaggeration of the membranes is particularly evident in FIG. 3. In fact, the membranes are thinner than the hold-down plates 52 and 54. The commercial tapes used in the invention are available on the market in only certain widths. In order to maximize the surface area of membrane which is operative, the cell was designed to use the maximum available width, which dimension sets the minimum distance between a pair of opposing screws 18. Lengthwise, as shown in FIG. 3, the tape is used in pieces equal to or larger than the overall length of cell 10, and suitable openings are formed in the tape for the gas passageways, as described below.

A single continuous gas passageway through cell 10 is provided by openings and slots in the screen assemblies cooperating with suitable passageways formed in the main members 12, 14 and 16. The carrier gas, which may be air or helium or some other gas depending upon the nature of the gases to be recovered, is supplied via conduit 32 through a passageway 56 formed in top member 12, a suitable clearance opening in membrane 24, an opening 58 formed in hold-down plate 52, and then a passageway 60 formed in framing member 48, to thereby impinge upon one end of the screen 50. Referring to FIG. 7, it can be seen that passageway 60 is of "keyhole" configuration. The carrier gas then proceeds through the screen 50 from end to end between the two associated membranes 24 and 26 picking up the gases which permeate through the membranes from the sample water on the opposite sides of the membranes. At the left side of FIG. 3 the carrier gas enters another passageway 62, similar to passageway 60, passes through an opening 64 in plate 54 (similar to opening 58 in plate 52), passes through a clearance opening in the membrane 26, and then through a passageway 66 formed in center member 14. As mentioned above, the two screen assemblies 20 and 22 are identical, and thus the pathway for the carrier gas through screen assembly 22 is provided in a similar manner, finally terminating at a passageway 68 in bottom member 16 which communicates with conduit 34. Conduit 34 delivers the collected gases to any conventional analytical means, such as a gas chromatograph.

Referring now to FIGS. 3 and 5 in particular, there is shown the means to flow the gas containing water into one side of the sample cell, out along the length of the membranes, across the four membranes, and then out of the cell. Top member 12 is formed with a pair of elongated arcuate grooves 70 each communicating with one of the conduits 36 and 42 which flow gas containing sample water through the top member 12. Member 12 is formed with passageways 36a and 42a which are in effect continuations of their associated conduits 36 and 42. In a similar manner, bottom member 16 is formed with a pair of grooves 72 interconnecting the passageways 40a and 46a. The center member 14 is formed with four grooves 74 each two of which form a clear flow pathway top to bottom, i.e., between the two membranes 26 and 28. The shape and location of the elongated grooves 70, 72 and 74 are instrumental in fully utilizing the membranes in that they spread the water out along the length of the tape and then flow it across the tape.

In operation, the water is supplied to the separator cell 10 under a pressure slightly greater than the pressure of the carrier gas, whereby the membranes are positioned against the screens as shown in FIG. 5 in particular, so that the gas containing water can flow over the outside surface of the membranes. The gases permeate the membranes until compositional equilibrium is obtained across the membranes. For this reason, relatively large amounts of sample water are flowed for relatively small amounts of carrier gas.

As an indication of orders of magnitude and to enrich the teaching, but not as a limitation, a sample cell in accordance with the invention has been built and successfully used, and this device measured about 10 inches long, about 1⅛ inches high and about 2 inches wide, was made entirely of brass and stainless steel, as described above, and utilized the plastic tape described which had a width of about 1 inch and a thickness of about 0.004 inches. In use, for example, sample water could be flowed at about 2 gal/min at a pressure of about 25 psi, and carrier gas at about 2 cc/min at atmospheric pressure.

While the invention has been described in detail above, it is to be understood that this detailed description is by way of example only, and the protection granted is to be limited only within the spirit of the invention and the scope of the following claims.

We claim:

1. A gas/liquid separation cell comprising a top member, a bottom member and a middle member therebetween, a first screen assembly positioned between said top member and said middle member, a second screen assembly positioned between said middle member and said bottom member, a gas/liquid separation membrane positioned to each side of each of said screen assemblies, whereby four such membranes are provided; means to removably secure all of said top, middle and bottom members, said two screen assemblies, and said four membranes together; means to flow liquid containing dissolved gases to the side of each of said membranes opposite said screen through said top, middle and bottom members across the outsides of said membranes, and thence away from said membranes; and means to flow carrier gas through said two screen assemblies serially, whereby dissolved gases in said fluid pass through said membranes and are picked up by said flow of carrier gas through said screens.

2. The combination of claim 1, each of said membranes consisting of a coherent film of unsintered polytetrafluoroethylene.

3. The combination of claim 1, each of said screen assemblies comprising a central framing member adapted to snugly receive a screen, said framing member in said screen having substantially equal thicknesses, said screen assemblies further comprising upper and lower hold-down plates, means to secure said hold-down plates to said framing member, and said hold-down plates being slightly larger than said framing member to grip the edges of said screen therebetween.

4. The combination of claim 3, said framing member and said hold-down plates consisting of brass, and said screen consisting of stainless steel having a wire size of 0.0075 and a mesh size of 60.

5. The combination of claim 3, said first and second screen assemblies being of identical construction and disposed in said separator cell in upside-down relationship to each other.

6. The combination of claim 5, said carrier gas flow means comprising registering passageways formed in said upper, middle and lower members and registering passageways formed in said screen assemblies, whereby said carrier gas flows through portions of said passageways in one of said upper and lower members, through said passageway in said first screen assembly through said screen in said first screen assembly from end to end thereof, through a passageway in the opposite end of said framing member, through the portions of said passageway in said middle member, through the similar structure in said second screen assembly, and out said passageway in the other of said upper and lower main members.

7. The combination of claim 1, said screen assemblies and said membranes being of elongated configuration, said means to flow said gas containing liquid comprising at least two elongated slots formed in each of said upper, middle and lower members, said slots being positioned to the opposite sides of said elongated membranes, whereby said liquid supplied to one side of said cell flows into said elongated slot and across the entire operative face of the associated membrane and then out the other slot.

8. In apparatus for separating gas out of a liquid in which the gas is dissolved by passing the gas laden liquid over a membrane to accomplish such separation, the improvement comprising making the membrane of a coherent film of unsintered polytetrafluoroethylene, whereby the gas passes through the porous film and the liquid is repelled by the film, said apparatus comprising a pair of elongated members, screen means between said members, an elongated membrane to each side of said screen means, means to flow liquid containing dissolved gases to one elongated side of each of said membranes and then across the outsides of said membranes and then away from said membranes, and means to flow carrier gas through said screen means.

* * * * *